United States Patent [19]

Yamamoto

[11] 4,234,058
[45] Nov. 18, 1980

[54] WEAR ALARM DEVICE FOR A VENTILATED DISK BRAKE

[75] Inventor: Masachika Yamamoto, Itami, Japan

[73] Assignee: Sumitomo Electric Industries, Ltd., Osaka, Japan

[21] Appl. No.: 931,585

[22] Filed: Aug. 7, 1978

[30] Foreign Application Priority Data

Aug. 20, 1977 [JP] Japan .................. 52-111520[U]

[51] Int. Cl.³ ........................................... F16D 66/02
[52] U.S. Cl. .................................. 188/1 A; 116/208; 192/30 W
[58] Field of Search ............... 188/1 A, 73.3, 73.5; 116/208; 192/30 W

[56] References Cited

U.S. PATENT DOCUMENTS 3,958,666  5/1976  Hooten et al. ................ 188/1 A

FOREIGN PATENT DOCUMENTS 2501519  7/1976  Fed. Rep. of Germany ......... 188/1 A
49-43862  11/1974  Japan .............................. 188/1 A Primary Examiner—George E. A. Halvosa
Attorney, Agent, or Firm—Sughrue, Rothwell, Mion, Zinn and Macpeak

[57] ABSTRACT

A spring member is biased toward the outer peripheral edge of a vented disk and is held out of engagement therewith by a locking device. As the brake pads wear, the pad backing plates come closer together, thus compressing the locking device and releasing the spring so that it may engage the ribs in the outer periphery of the disk. The spring member is shaped to prevent excessive protrusion into the apertures in the disk and to permit reverse rotation of the disk.

3 Claims, 6 Drawing Figures

WEAR ALARM DEVICE FOR A VENTILATED DISK BRAKE

BACKGROUND OF THE INVENTION

This invention relates to a disk brake pad wear warning device and, more particularly, to such a device particularly suitable for a vented disk brake.

It is often desirable that the car operator be informed of excessive brake pad wear prior to the occurrence of brake failure and/or brake damage and, therefore a variety of pad wear warning devices have been proposed.

A system in which, when the wear of a brake pad reaches its use limit, an elastic contactor is brought into contact with a rotating disk, as a result of which a sound is generated to indicate the wear of the pad, is disclosed in Japanese Patent Publication No. 43862-1974. In the warning device therein disclosed, as shown in FIG. 1, a spring member 108 is suspended above the disk. The upper portion of the spring member includes flange portions 109 and 110, the former being relatively large and the latter relatively small. The lower portion 113 of the spring member 108 includes a pair of hook portions 112 for engaging the small flanges 110 when the device is set. The flanges 109 abut the disk brake pad backing plates so that when excessive wear has occurred the flanges 109 and, consequently, the flanges 110 will be compressed together, thereby releasing the lower portion 113 to press against the outer periphery of the disk. Such an arrangement is unsuitable for use in a vented disk brake system for two reasons. First, when the lower portion 113 presses against the periphery of the disk, there is a danger that it will protrude too far into the recesses in the outer periphery of the disk to thereby be bent or otherwise damaged. Secondly, when excessve brake wear has occurred and the portion 113 has been released, a slight backward movement of the vehicle, such as may occur on an incline or when operating the vehicle in reverse, will cause the tip of the portion 113 to engage the inner wall of the disk groove into which it protrudes and the warning device will be destroyed as the portion 113 is forced to the right as viewed in FIG. 1.

SUMMARY OF THE INVENTION

Accordingly, it is an object of this invention to provide a wear indicator which is suitable for ventilated disk brakes.

Briefly, in accordance with the present invention, this is achieved by providing an elastic member for contacting the outer peripheral surface of the disk. The elastic member is held out of contact with the disk by a locking device which is in contact with the backing plates on each brake pad and is released when the backing plates come too close together. The elastic member is provided with tabs that are wider than the grooves in the disk to prevent excessive penetration thereinto and the elastic member is provided with a curved surface for contacting the disk to enable bidirectional rotation of the disk without damage.

BRIEF DESCRIPTION OF THE DRAWINGS

This invention, will now be described with reference to the drawing, in which.

DETAILED DESCRIPTION OF THE INVENTION

Figure 2:
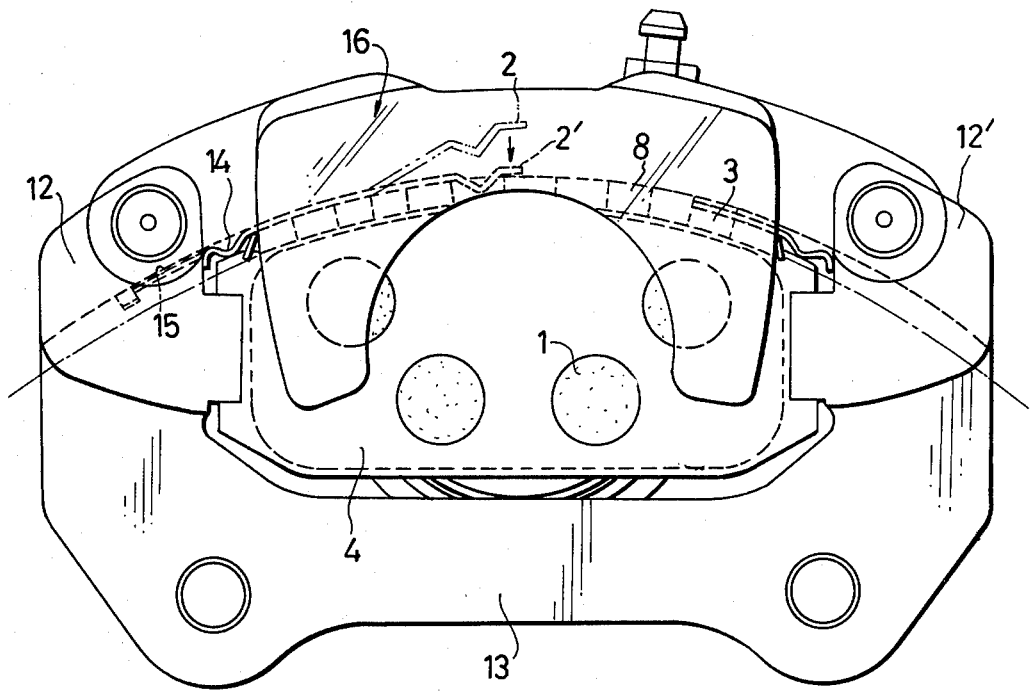
FIG. 2 is a side view illustrating a ventilation type disk brake with an abrasion alarm device according to this invention.
Figure 3:
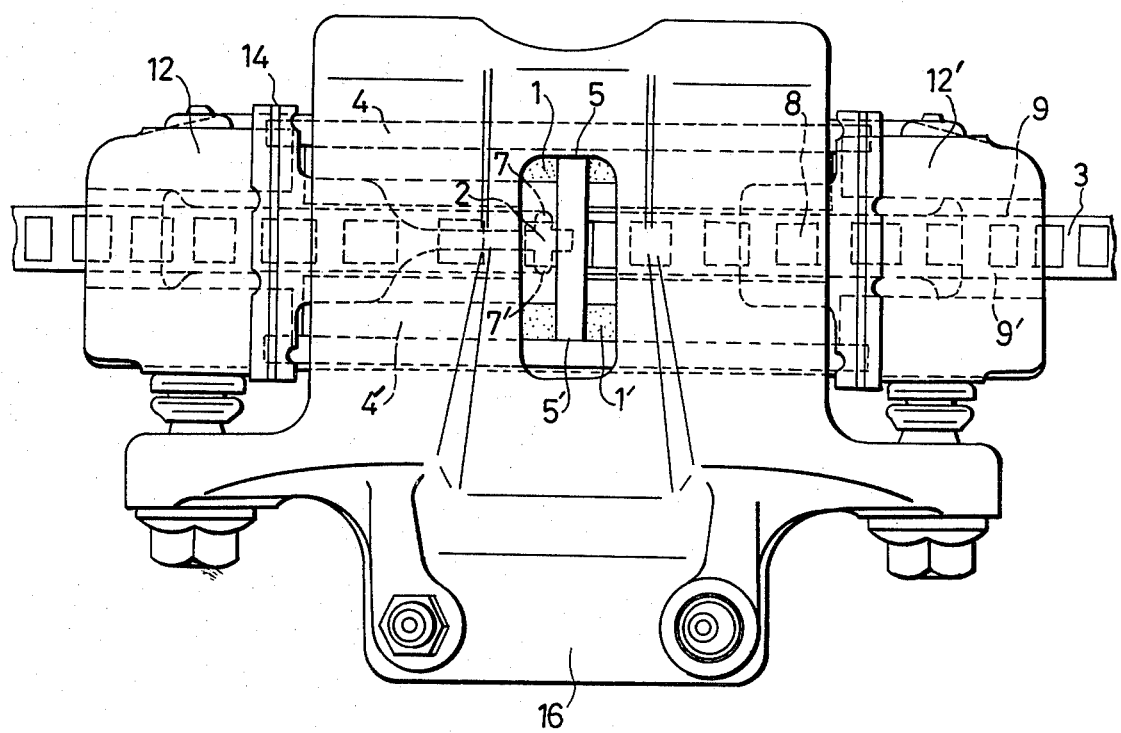
FIG. 3 is a plan view showing the ventilation type disk brake with the abrasion alarm device in FIG. 1.

In a ventilation type disk brake which is one preferred embodiment of this invention, frictional brake pads 1 and 1' affixed respectively to backing plates 4 and 4' are provided opposite to each other and substantially symmetrically with respect to a ventilation type disk 3, as shown in FIGS. 2 and 3. In the ventilation type disk 3, slit grooves 8 are formed by radially disposing spacer members between the disk side plates 9 and 9'.

In this invention, a caliper 16 straddling the peripheral portion of the disk 3 comprises a stationary member 13 and U-shaped arms 12 and 12'. An elastic contactor 2 is made of a leaf spring. When no force is exerted on the elastic contactor 2, it is positioned as indicated by reference numeral 2' in FIG. 2. In this case, the contactor 2 engages with the rotating ventilation type disk to thereby generate a sound.

Figure 1:
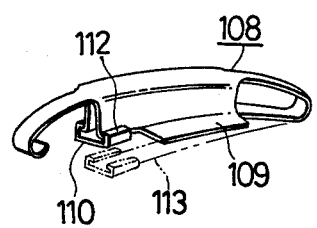
FIG. 1 is a perspective view of part of a known warning device.
Figure 4:
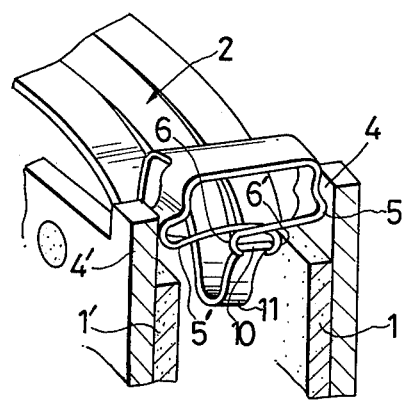
FIG. 4 is an enlarged perspective view for a description of a locking device for the elastic contractor shown in FIGS. 1 and 2.

The elastic contactor 2 and its locking device are shown in FIGS. 4 and 5. The locking device comprises two arms 5 and 5' which are extended in the disk depression directions of the two pads 1 and 1', or in the opposite axial directions of the disk, and the end protrusion 10 of the elastic contactor which is supported and locked by two pawls 6 and 6' which are extended from the ends of the two arms, bent in the form of the letter "S" and crossed with each other. Under normal conditions the two arms will engage the end protrusion to form the locking device. The elastic contactor is lifted by the locking device thus constructed so that it is not in contact with the disk. As the wear of the pads is increased, the two arms, being depressed by the backing plates, will reach the predetermined wear limit of the disk. At this instant, the crossed pawls are opened to drop the end protrusion 10 of the elastic contactor. As a result, a part 11, bent downwards, of the elastic contactor is brought into contact with the rotating ventilation type disk, to thereby generate a sound. The specific features of this locking device reside in that it is simple in construction and it will work reliably.

Figure 5A:
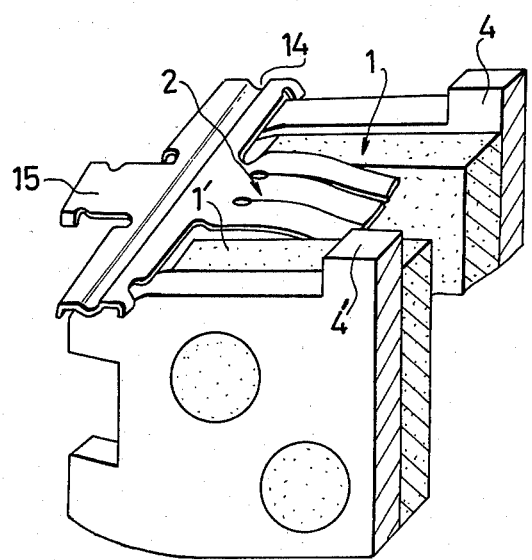
FIGS. 5A and 5B are enlarged perspective views for a description of the construction of the elastic contactor.
Figure 5B:
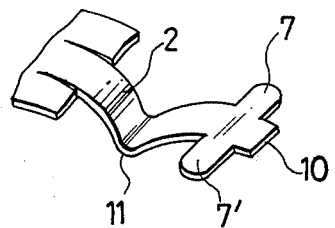

The elastic contactor, as shown in FIGS. 5A and 5B, is provided with pad retaining arms 14 and a stationary ear 15 on one end portion, and is provided with the end protrusion 10 held by the two pawls of the locking device, lateral protrusions 7 and 7' protruded in the disk axial direction, and the part 11 bent downwards and adapted to strike the slit grooves in the ventilation type disk to generate a sound. When the locking device is disengaged from the downwardly bent portion 11 of the elastic contactor whereby the bent portion 11 is brought into contact with the slit grooves 8 in the rotating disk to generate a sound, the lateral protrusions 7 and 7' are brought into contact with the disk side plates 9 and 9', respectively. Accordingly, the deformation or damage of the downwardly bent part 11, which otherwise may be caused by the bent part's deep penetration into the slit groove, can be prevented. This is effective for protection of the elastic contactor especially when the disk is rotated in the reverse direction by the backward movement of the automobile.

The curvature of the downwardly bent part 11 of the elastic contactor is such that the bent part 11 does not enter deeply into the slit grooves (8), thus further contributing to the prevention of the deformation or damage of the elastic contactor.

As is apparent from the above description, the wear alarm device according to this invention will positively work when the wear of the pads reaches the use limit. Furthermore, the wear alarm device can be manufactured at low cost, and yet has a high reliability against deformation and damage.

What is claimed is:

1. A wear alarm device for a ventilation type disk brake having a ventilated disk with grooves on the outer periphery thereof, of the type in which when frictional brake pads mounted on backing plates reach a use limit in thickness, an elastic contactor is released to contact the peripheral portion of a rotating brake disk to generate an abnormal sound indicating excessive wear of said disk brake pads, the improvement comprising:

said elastic contactor comprising a leaf spring member comprising a first portion secured at a first end at a position radially adjacent the outer periphery of said ventilated disk and having a second end which is movable when released in a plane substantially parallel to the plane of said disk, said first portion being narrower than the grooves in the outer periphery of said ventilated disk to penetrate into said grooves when released, said first portion having a downwardly bent part located between said first and second ends for penetrating into said grooves, said downwardly bent part having a sufficiently large curvature as to prevent excessive penetration into said grooves, and at least one second portion extending from a region between said downwardly bent part and the second end of said first portion in the axial direction of said disk beyond said grooves to engage the disc periphery on opposite sides of the elastic contactor.

2. An alarm device according to claim 1, wherein said second portion comprises first and second protrusions extending from either side of said elastic contactor in the axial direction of said disk.

3. An wear alarm device according to claim 1, further comprising a locking device having first and second arms extending in opposite directions crossing one another and having curved inner ends which engage the sides of said elastic contactor to hold said contactor away from said disk, the outer ends of each said arm contacting the backing plate furthest from the side where said first end of said leaf spring member is secured so that when excessive pad wear occurs the arms are urged inwardly to release said contactor.

* * * * *